United States Patent
Campbell et al.

(10) Patent No.: US 6,929,388 B2
(45) Date of Patent: Aug. 16, 2005

(54) AUTO HEADLAMP MODULE WITH INTEGRATED PHOTOCELL

(75) Inventors: Douglas C. Campbell, Northville, MI (US); Gerard Grabowski, Brownstown, MI (US); Mohamed Zeidan, Dearborn Heights, MI (US); Robert Muller, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 19 days.

(21) Appl. No.: 10/198,647

(22) Filed: Jul. 17, 2002

(65) Prior Publication Data

US 2003/0039125 A1 Feb. 27, 2003

(Under 37 CFR 1.47)

Related U.S. Application Data

(60) Provisional application No. 60/309,343, filed on Aug. 1, 2001.

(51) Int. Cl.$^7$ .................................................. B60Q 1/06
(52) U.S. Cl. ....................... 362/467; 362/276; 362/802; 315/82; 315/159
(58) Field of Search .............................. 315/77, 82, 83, 315/159, 149, 150; 362/464, 465, 467, 376, 802, 489

(56) References Cited

U.S. PATENT DOCUMENTS

| | | | |
|---|---|---|---|
| 3,879,617 A | * 4/1975 | Faller | 307/10.8 |
| 5,036,437 A | 7/1991 | Macks | |
| 5,473,515 A | 12/1995 | Liu | |
| 6,288,492 B1 | * 9/2001 | Wolfe | 315/82 |

* cited by examiner

Primary Examiner—John Anthony Ward
(74) Attorney, Agent, or Firm—Bill C. Panagos

(57) ABSTRACT

A switch assembly module for controlling operation of a vehicle lamp includes a photocell integrated within the module housing to allow a controller to automatically switch the lamp on or off depending on detected ambient level. A manual switch is provided on a faceplate of the housing to allow disabling of the automatic operation feature. A manual switch can also be provided to allow variable dimming of the lamp. Integration of the photocell into the switch assembly module eliminates the need for separate instrument panel wiring to the photocell, while reducing wiring harness complexity by allowing the same harness and connector to be used with a module not having the photocell integrated therein.

5 Claims, 1 Drawing Sheet

AUTO HEADLAMP MODULE WITH INTEGRATED PHOTOCELL

CROSS-REFERENCE TO RELATED APPLICATIONS

This application claims the benefit of U.S. provisional application Ser. No. 60/309,343 filed on Aug. 1, 2001.

TECHNICAL FIELD

The present invention generally relates to vehicle headlamp control systems, and more particularly, to an improved headlamp switch assembly module.

BACKGROUND ART

Generally, systems have been developed to eliminate the necessity for manually turning on and off vehicle lamps. Such systems typically employ a photocell to detect ambient light levels, and produce an electrical response that varies with changing ambient light levels. A power coupling switch is responsive to these changes to control turning a lamp on or off at preset levels. Examples of such systems include auto headlamp control sensors which automatically turn headlamps on in the dark, and off in daylight.

While these systems provide a desired increase in convenience to a vehicle operator, known arrangements utilize a photocell circuit separately located from the lamp switch control unit. Unfortunately, such an arrangement requires separate instrument panel wiring to both the switch control unit and the photocell circuit, thereby increasing the cost of manufacture as well as necessitating the use of wiring harnesses specifically adapted to operate with a switch control system having a photocell control input.

Thus, a need exists for a vehicle lamp switch control arrangement which can provide automatic control of lamp illumination without requiring additional and/or specialized wiring harnesses.

DISCLOSURE OF INVENTION

It is therefore an object of the present invention to provide a switch module capable of automatically controlling operation of a vehicle lamp that does not require a specialized or additional wiring harness.

In accordance with this and other objects, the present invention provides a switch module for controlling operation of a vehicle lamp, such as a headlamp, having a housing arranged to be mounted to a control panel within the vehicle interior, wherein the housing comprises a faceplate having a surface exposed to the vehicle interior. A sensor is mounted to the housing and arranged to detect ambient light through an opening in the faceplate. The sensor is arranged to provide an output signal as a function of the level of ambient light detected by the sensor. A controller is connected to the vehicle lamp and the sensor output signal, and arranged to determine the detected level of ambient light based on the output signal, and automatically turn the vehicle lamp on or off at predetermined ambient light levels.

In accordance with one aspect of the present invention, the switch module can include at least one manually actuated control switch mounted to the faceplate and connected to the controller, wherein the manually actuated switch is arranged to selectively enable or disable automatic operation of the vehicle lamp.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
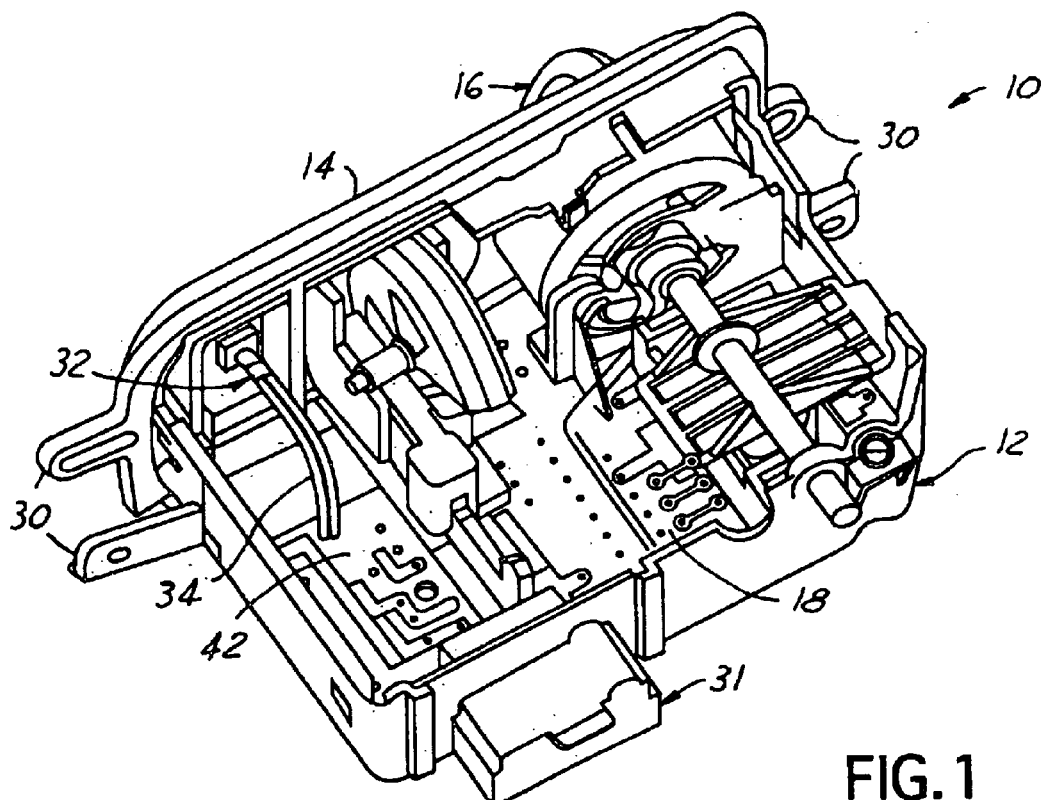
FIG. 1 is an elevated perspective view of a switch assembly module as seen from the back of the module in accordance with the present invention.
Figure 2:
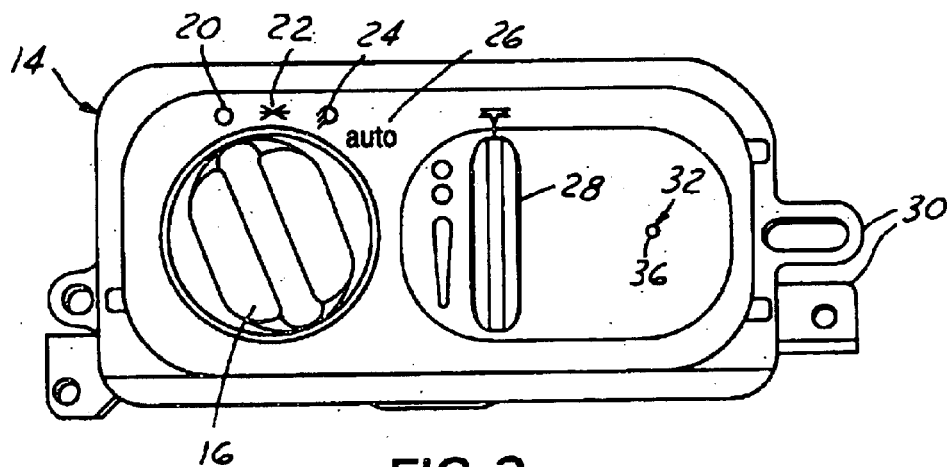
FIG. 2 is a faceplate for the switch assembly module of FIG. 1.

Referring to FIGS. 1 and 2, a lamp switch control module 10 is shown having a base housing structure 12 connected to (or integrally molded with) a face plate 14. The specific module configuration shown in FIGS. 1 and 2 is for illustrative purposes only. At least one manually actuated switch 16 is supported by the face plate, and is coupled with an associated electrical circuit 18 mounted within housing 12. Switch 16 is arranged to control power to the headlamps and parking lights of the vehicle. Switch 16 can be manually operated to: turn off the vehicle lamps in position 20, turn on the vehicle parking lights in position 22, turn on the headlamps in position 24, and set the system in automatic mode (described below) in position 26. In the exemplary embodiment shown, a second manually actuated switch 28 is supported on the face plate, and is arranged as a dimmer switch to control illumination of a vehicle dome/interior light. Module 10 includes attachments supports 30 to allow mounting to a vehicle instrument panel, and a wiring harness connector 31 to allow connection to the vehicle wiring system.

In accordance with the present invention, automatic operation of the vehicle lamps, such as the headlamps, is provided by integrating a light sensing arrangement 32 into the module 10. Light sensing arrangement 32 can include a photocell, photoresistor, photodiode, or phototransistor element, arranged to generate an output signal 34 proportional to the level of ambient light detected by the sensor. As shown, the light sensor is supported by face plate 14, which includes an opening 36 formed therein to facilitate passage of ambient light through the faceplate for detection by the sensor element. A lens 38, which can be arranged to perform optical filtering, can be mounted in the opening to provide a protective covering and/or optical filtering of the ambient light.

Figure 3:
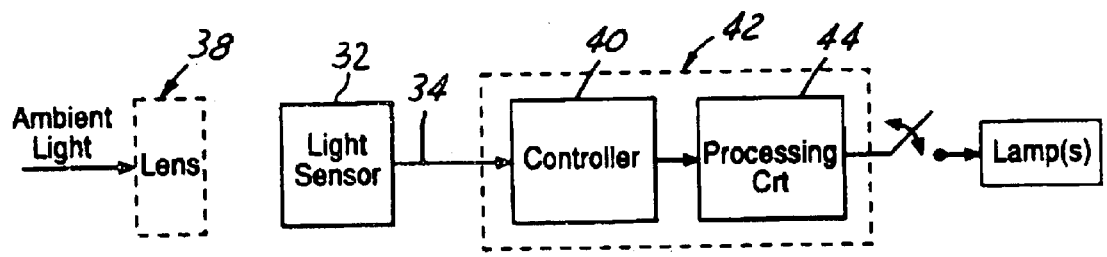
FIG. 3 is a block circuit diagram of a automatic headlamp control arrangement in accordance with an exemplary embodiment of the present invention.

As best seen in the block diagram of FIG. 3, output 34 is received by a controller 40 in a control circuit 42. In addition, the controller also receives an input from at least switch 16. The output from switch 28, if present, can be connected to controller 40, or bypass the controller for direct connection to the interior lamp. Controller 40 is arranged to control operation of the vehicle lamp(s) via the mode set by switch 16. More specifically, when the automatic mode has been set, the controller is arranged to turn on the lamps via a processing circuit 44 when the level of ambient light detected by sensor 32 has fallen below a predetermined level. The processing circuit can include a relay circuit or other circuit arranged to automatically turn off the lamps a predetermined period of time after the key has been removed from the vehicle ignition, or the vehicle engine has been shut off. In addition, controller 40 will automatically turn off the light via the processing circuit when the level of ambient light detected by sensor 32 exceeds a predetermined level.

Thus, the present invention advantageously integrates a light sensing arrangement into a lamp switch control module to eliminate the need for specialized and/or complex wiring harness arrangements. Wiring of the light sensing arrangement is accomplished internal to the module. As a consequence, the same wiring harness used for a module without automatic operation capability could be used with a module in accordance with the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A switch module for controlling operation of a vehicle lamp comprising:
    a housing arranged to be mounted to a control panel within the vehicle interior, wherein the housing comprises a faceplate having a surface exposed to the vehicle interior;
    a light sensor mounted to the housing and arranged to detect ambient light through an opening in the faceplate, the sensor providing an output signal as a function of the level of ambient light detected by the sensor; and
    a controller connected to the vehicle lamp and the sensor output signal, and arranged to determine the detected level of ambient light based on the output signal, and automatically turn the vehicle lamp on or off at predetermined ambient light levels.

2. The switch module of claim 1 wherein the sensor comprises a photocell.

3. The switch module of claim 1 wherein the controller is located within the housing.

4. The switch module of claim 1 further comprising a manually actuated control switch mounted to the faceplate and connected to the controller, wherein the manually actuated switch is arranged to selectively enable or disable automatic operation of the vehicle lamp.

5. The switch module of claim 1 wherein the vehicle lamp comprises a headlamp.

* * * * *